Feb. 20, 1945.  R. E. BAKER ET AL  2,369,638
RELEASABLE COUPLER
Filed Oct. 11, 1943  2 Sheets—Sheet 1
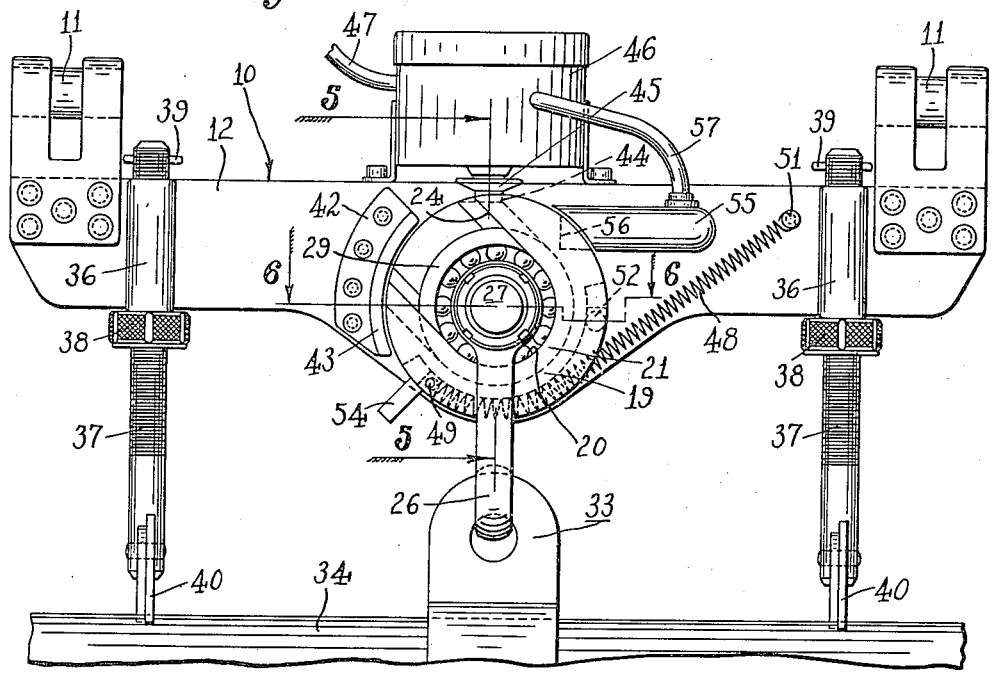
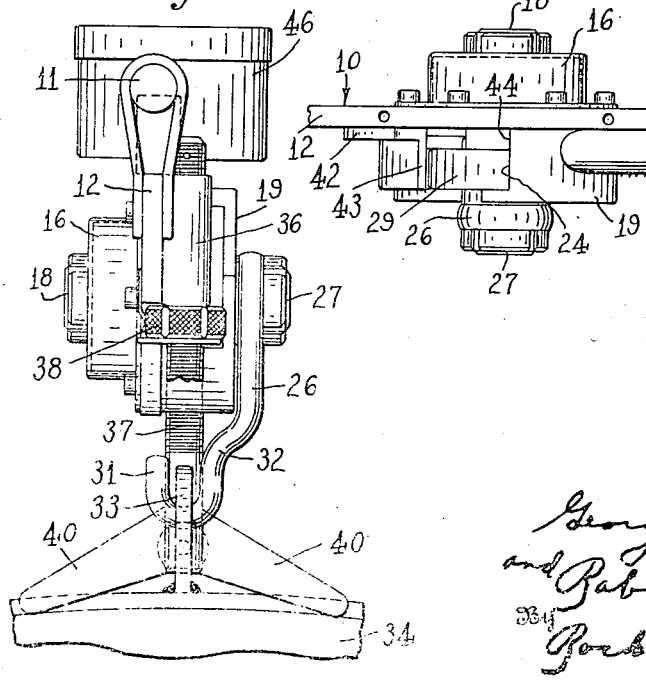
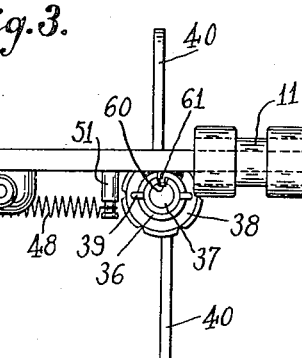

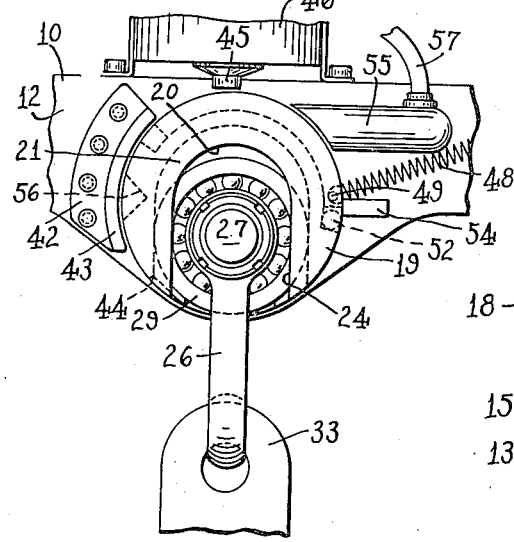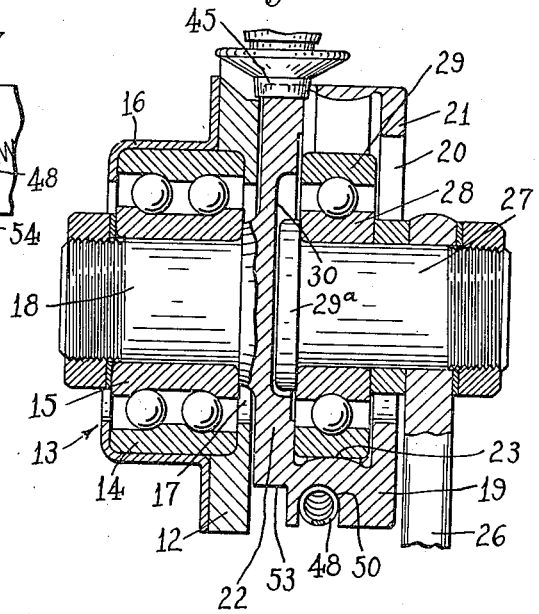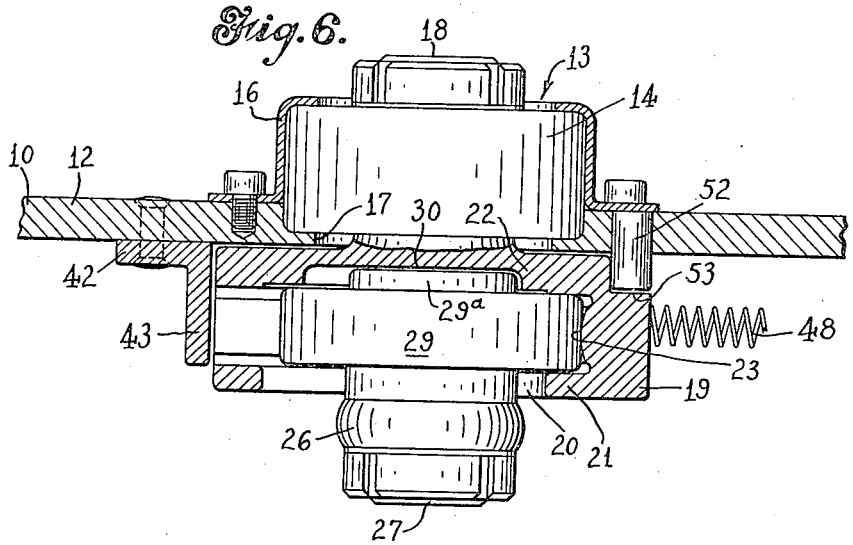

Patented Feb. 20, 1945

2,369,638

UNITED STATES PATENT OFFICE 2,369,638

RELEASABLE COUPLER

Robert E. Baker, New Haven, and George H. Kendall, Darien, Conn., assignors to Sargent & Company, New Haven, Conn., a corporation of Connecticut Application October 11, 1943, Serial No. 505,863

15 Claims. (Cl. 294—83)

This invention relates to releasable couplers and more particularly to a device of this character wherein the elements which are coupled together are so situated or handled that the coupling means is under tension or strain and it is desired that the coupling means be so arranged that one element may be released from the other without the necessity of relieving the tension on the coupling member and by means of a minimum amount of effort.

As shown, the invention is applied to the release of heavy objects such as bombs, for example, from the bomb-racks of an aeroplane but it, will be understood that the principles of the invention are applicable in many other relations. For example our improved coupler may be employed as a truck coupler for trailers of industrial trucks or tractor trucks. It may also be employed in a crane or hoist coupler, as a boat coupler, and for the support and release of airmail from aeroplanes, in addition to other applications not here recited.

Formerly, devices which have been employed for the purposes mentioned above have had certain disadvantages due to the fact that when the elements of the coupling were under tension the releasing means had to be operated against this pull, thus requiring a considerable amount of effort and, in some instances, the releasing means had to bear a part of the load or pull upon the coupling.

Substantially all of the prior couplers employ levers or similar devices to reduce the effect of this tension upon the releasing mechanism but, while this reduction was effected to some extent, the release of the two elements coupled together has never been effected without the necessity of overcoming a considerable amount of resistance.

One object of the present invention is to provide a leverless coupling, in that no such devices are employed to bear the load or to effect release of one element from the other.

Another object of the invention is the provision of an improved releasable coupling such that the elements that are coupled together may be released when the coupling means is under tension, with a minimum of effort.

A still further object of the invention is to provide a releasable coupling for carrying a relatively heavy load such that the coupling may be released unaccompanied by any raising or elevating of the load and thus effecting a reduction in amount of release-effort required.

A still further object of the invention is to provide a releasable coupling so arranged that release of the coupled elements is effected by the turning of the supporting member about the pivot of the coupling device, this turning or rotation being effected with a minimum amount of friction, and the friction being the only resistance necessary to be overcome by the releasing mechanism.

Still another object of the invention is the provision of a releasable coupler having a rotatable releasing element so arranged that, after an initial impulse or rotation is imparted to this element, the weight or strain upon the coupling device will tend to complete the releasing movement without the application of additional force.

To these and other ends, the invention consists in the novel features and combinations of parts to be hereinafter described and claimed.

In the accompanying drawings:

Fig. 1 is a side elevational view of a bomb shackle to which is secured (by our improved coupling device) a bomb;

Fig. 2 is a side elevational view of the same;

Fig. 3 is a top plan view of the right-hand portion of the device;

Fig. 4 is a view of the coupling means with the parts shown in a position different from that shown in Fig. 1;

Fig. 5 is a sectional view on line 5—5 of Fig. 1; and

Fig. 6 is a sectional view on line 6—6 of Fig. 1.

While, as previously stated, our improved coupler is applicable to many types of installation, it is shown in the accompanying drawings as applied to the coupling of bombs to bomb shackles for support in bomb racks of an aeroplane, the bomb shackle being shown at 10 and being provided with supporting devices 11 at each end by which it may be suspended from the bomb racks (not shown) of the aeroplane.

The shackle 10 consists of a rigid body member 12, to which the suspending devices 11 are secured. Mounted adjacent the central portion of the body member 12 is a bearing device such, for example, as the roller bearing 13 consisting of the outer race 14 and inner race 15, the bearing being secured in place by the cup or casing 16 secured to the member 12.

Opposite this bearing member, the body 12 is provided with an opening 17 through which projects a stub shaft 18 snugly fitted to the inner race 15 of the bearing so that the shaft will be rotatably supported by the bearing to rotate with a minimum of friction.

Secured to or formed integrally with the shaft 18, and disposed upon the opposite side of the body 12 from the bearing 13 is a cradle 19 of cup-shaped form. The outer face of this cradle is open at 20 and surrounding this opening is a substantially annular flange 21, thus forming with the bottom or rear wall 22 of the cradle an annular channel or trough 23.

As shown particularly in Figs. 1 and 4, the cradle is slotted as at 24, this slot extending through the peripheral edge of the cradle so as to effect an opening into the channel or trough 23, the slot of course also communicating with the opening 20 in the face of the cradle.

As shown, the coupling element comprises a hooklike member 26 suspended from a pin or stub shaft 27 secured to the inner race 28 of a ball-bearing, the outer race 29 of which fits snugly in the channel 23 of the cradle so that the axis of the shaft 27 is coincident with that of the shaft 18. The inner end of the shaft 27 may be headed as shown at 29ª, this head being disposed in a recess 30 in the rear wall 22 of the cradle.

The lower hook end 31 of the member 26 is offset as shown at 32 so that the hook lies substantially in a position below the supporting members 11, and carried upon this hook, as has been illustrated, is an ear or lug 33 attached to the member to be drawn or supported, which, in the present instance, is shown as a bomb 34.

The shackle body 12 is provided with sleeve members 36 in which are freely mounted threaded bolts 37 having adjusting nuts 38 thereon, the bolts being held from detachment by the adjusting nuts and pins 39. To the lower ends of these bolts, sway braces 40 are pivoted, which braces are adapted to contact with the upper surface of the bomb to prevent swaying or tilting of the latter with respect to the shackle. It will be understood that the effective length of the bolts 37, below the body 12, may be adjusted by means of the adjusting nuts 38 so that the shackle will be secured rigidly to the element or member 34.

From the foregoing, it will be obvious that, when the cradle is in the position shown in Fig. 4, the bearing attached to the coupling member 26 may be slipped upwardly into the slot 24 and the cradle turned to the position shown in Fig. 1, in which the coupling element and the load which it supports will be carried by the cradle.

In order to prevent any likelihood of the bearing race 29 becoming detached from the cradle, a guard member 42 may be secured on the body member 12. This guard is L-shaped in cross section, having a flange 43 disposed at right angles to the member 12, which flange stands in the mouth of the slot 24 and prevents the bearing race 29 from emerging from this slot when the cradle is rotated from the position shown in Fig. 4.

In order to hold the cradle in position shown in Fig. 1 even though the coupling member 26 may be under considerable tension, a recess 44 is formed in the outer periphery of the cradle, this recess having a shoulder against which stands a movable detent 45, this detent being controlled by a solenoid shown diagrammatically at 46 so that when, as shown in Fig. 1, the detent is raised from engagement with the shoulder of the recess 44, the cradle will be free to turn. Electrical connections to the solenoid are shown at 47.

It will also be apparent that, as the bearing 29 fits snugly in the channel of the cradle, there will be little or no tendency of the cradle to be rotated even though the member 26 is under tension, and to secure a positive release of the coupling member, it is desirable to initiate rotation of the cradle. In the present instance, this is effected by means of a spring 48, one end of which is secured to a pin 49 provided in a peripheral slot 50 in the cradle, the other end of the spring being secured at 51 to the body member 12.

As shown particularly in Fig. 5, the slot 50 is of such dimensions relatively to the spring that one end of the latter will lie in this slot. It will be obvious that when the detent 45 is raised from engagement with the cradle, rotation of the latter will be initiated by the spring 48 and that when the cradle has been rotated through a small angle so that the lower portion of the slot 24 will be inclined slightly below the vertical toward the mouth of the slot there will be a tendency of the bearing 29 to roll toward the mouth of the slot and thus effect continuous rotation of the cradle to full releasing position shown in Fig. 4. Rotation of the cradle may be limited at either end of its range of movement by means of a pin 52 secured to the body 12 and disposed in a recess 53 at the rear face of the cradle so that the pin will abut the shoulders at either end of this recess when the cradle is in the position shown in Figs. 1 and 4. The movement of the cradle will, therefore, be stopped in one direction when it reaches the position shown in Fig. 4 and will be stopped in the other direction when it reaches the position shown in Fig. 1, in which position the shoulder of the recess 44 may be engaged by the detent 45. It will also be obvious that it is only necessary for the spring 48 to initiate the rotation of or give an initial rotating impulse to the cradle and that this movement will be continued or completed by the weight of the object 34 or the tension applied to the coupling member 26. The cradle may be returned from the position shown in Fig. 4 to that shown in Fig. 1 by any suitable means such as the pin 54.

It may be desirable, in some instances, to give a starting impulse to the cradle 19 by means of an explosive cartridge shown at 55 as mounted upon the body member 12, which cartridge may be employed in place of or in addition to the spring 48. The discharge of this cartridge will be directed against the shoulder of a recess 56 formed in the periphery of the cradle 19, and the cartridge may be fired by electrical energy furnished through the cable 57 leading from the solenoid 46 so that the explosion will be practically coincident with the release of the detent 45 from the shoulder of the recess 44.

It may be noted that there is a double row of ball-bearings between the races 14 and 15, thus giving a stationary support to the stub shaft 18, while a single row of bearing balls suffices between the races 28 and 29. The bolt 37 may be prevented from turning with relation to the shackle body 12 by means of a keyway 60 provided longitudinally in the body of the bolt and key 61 extending in this keyway, which key may be provided by turning inwardly one edge of the collar or sleeve 36. In this manner, the arms 40 are always kept in proper position to engage the body of the bomb 34 and prevent any swiveling or turning thereof.

The operation of the device is believed to be clear from the foregoing description. When the shackle is attached to the bomb or to any other object to which it is to be applied, the element 26 will usually not be under tension and hence the cradle 19 may be easily rotated to the position shown in Fig. 1 in which the arm 26 will be secured to the shackle. The adjusting nuts 38 are then adjusted so that the arms 40 will tightly engage the bomb and the device is ready for installation or hanging on the bomb rack of an aeroplane.

When it is desired to release the hook element 26 it is only necessary to rotate the cradle 19 through a small arc. As the axis of the shaft 27 is coincident with that of the shaft 18, the only force necessary to be overcome will be that of friction as it is not necessary to raise or move the load in any direction to rotate the cradle. Thus it is important to minimize the amount of this friction as much as possible. This is done not only by the support in ball or similar bearings of the shaft 18 but also by supporting the shaft 27 in a similar manner, for it will be noted that the cradle 19 does not have to rotate against the friction of the race 29 but this race will rotate with the cradle, the only friction present being that of the ball-bearings between the races 28 and 29. Thus, a very small amount of effort is necessary for the release of the coupling. In actual tests, it has been determined that with a 2" leverage for the action of the spring 48 or other releasing means a pull of three pounds is required to rotate the cradle when the member 26 is under a gravity pull of five hundred pounds. This force will increase in proportion to the load carried by the hook 26 so that it would require a pull of twelve pounds two inches from the fulcrum point to release a two thousand pound bomb.

In the application of the present device to trailers or any other relations where the tension upon the coupling element 26 is horizontal rather than a pull due to gravity, the release may be effected without relieving the tension whereas at the present time it is usually necessary to relieve the tension due to the draft before the trailers may be uncoupled.

It will therefore be obvious that we have provided a coupling device which may be released while the parts are under tension, with a minimum of effort and at the same time the device will be efficient in operation and there will be no danger of accidental release. Owing to the fact that the tension on the coupling element 26 will be directly in line with the axis of rotation of the cradle, there will be no tendency for the cradle to rotate under strain and therefore the force required to withdraw the detent 45 from engagement with the shoulder of the cradle will be a minimum.

While we have shown and described a preferred embodiment of our invention, it will be understood that it is not to be limited to all of the details shown but is capable of modification and variation within the spirit of the invention and within the scope of the appended claims.

What we claim is:

1. A coupling for releasably securing two elements together, comprising a member rotatably secured to one of said elements and having an arcuate cradle thereon concentric with its axis of rotation, said cradle being provided with a radially extending releasing opening, and a second member secured to the other element and having an anti-friction bearing thereon embraced by said cradle and received therein through said opening.

2. A coupling for releasably securing two elements together, comprising a member rotatably secured to one of said elements and having an arcuate cradle thereon concentric with its axis of rotation, said cradle being provided with a radially extending releasing opening and a second member secured to the other element and having an anti-friction bearing thereon embraced by said cradle and received through said opening, the axis of rotation of said first member coinciding with the axis of said bearing.

3. In a releasable coupling for releasably connecting two elements together, a releasing member rotatably secured to one of said elements and having an arcuate shaped retaining cradle thereon, a radial opening in said cradle, a tension member secured to the other element having a part adapted to be embraced by said cradle, and anti-friction bearing means between said part and said cradle, and said part being insertable into and releasable from said cradle through said opening.

4. In a releasable coupling for releasably connecting two elements together, a releasing member rotatably secured to one of said elements and having an interrupted arcuate retaining means thereon, a tension member secured to the other element and having a part rotatably mounted thereon, said part being adapted to be embraced by said means to retain said members in engagement, the axes of rotation of said part and said releasing member being coincident, and said part being carried on anti-friction bearings on said tension member, and means to retain said releasing member against rotation.

5. In a releasable coupling for releasably connecting two elements together, a releasing member rotatably secured to one of said elements and having a cradle with an interrupted arcuate retaining flange thereon, a tension member secured to the other element having a part adapted to be embraced by said flange, and anti-friction bearing means between said part and said flange, and the center of said cradle being coincident with the axis of rotation of said releasing member.

6. In a releasable coupling for releasably connecting two elements together, a releasing member rotatably secured to one of said elements and having an interrupted arcuate retaining flange thereon, a tension member secured to the other element having a part adapted to be embraced by said flange, anti-friction bearing means between said part and said flange, means for holding said releasing member against rotation, and means for imparting a rotating impulse to said releasing member when said holding means is withdrawn.

7. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, and a bearing ring rotatably mounted on anti-friction bearings on said tension member, said bearing ring being insertable into said runway through said opening to be engaged and released by said cradle upon rotation thereof.

8. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, and a bearing ring rotatably mounted on anti-friction bearings on said tension member, said bearing ring being insertable into said runway through said opening to be engaged and released by said cradle upon rotation thereof, and the axis of rotation of said bearing ring being coincident with that of the cradle.

9. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, a bearing ring rotatably mounted on anti-friction bearings on said tension member, said bearing ring being insertable into said runway through said opening to be engaged and released by said cradle upon rotation thereof, and the axis of rotation of said bearing ring being coincident with that of the cradle, and releasable means engaging said cradle for holding it against rotation.

10. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, a bearing ring rotatably mounted on anti-friction bearings on said tension member, said bearing ring being insertable into said runway through said opening to be engaged and released by said cradle upon rotation thereof, and the axis of rotation of said bearing ring being coincident with that of the cradle, releasable means engaging said cradle for holding it against rotation, and means for imparting a rotating impulse to said cradle upon release of said holding means.

11. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, a bearing ring rotatably mounted on anti-friction bearings on said tension member, said bearing ring being insertable into said runway through said opening to be engaged and released by said cradle upon rotation thereof, and the axis of rotation of said bearing ring being coincident with that of the cradle, releasable means engaging said cradle for holding it against rotation, and means for imparting a rotating impulse to said cradle upon release of said holding means, said last-named means comprising a spring connected to said cradle and to said first element to exert a rotating force on the cradle.

12. In a releasable coupling for releasably connecting two elements together, a releasing member secured to one of said element, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, a bearing ring rotatably mounted on anti-friction bearings on said tension member, said bearing ring being insertable into said runway through said opening to be engaged and released by said cradle upon rotation thereof, and the axis of rotation of said bearing ring being coincident with that of the cradle, releasable means engaging said cradle for holding it against rotation, and means for imparting a rotating impulse to said cradle upon release of said holding means, said last-named means comprising an explosive cartridge mounted adjacent said cradle and arranged upon detonation thereof to exert a rotating force on the cradle.

13. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, and said tension member having a part embraced by said cradle and released through said opening when said cradle is rotated.

14. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening in its periphery, a tension member secured to the other of said elements, said tension member having a part embraced by said cradle and released through said opening when said cradle is rotated, and means for releasably holding said cradle against rotation.

15. In a releasable coupling for releasably connecting two elements together, a releasing member secured to one of said elements, said member comprising a cradle rotatably carried by said element, said cradle comprising a cup-shaped member having an arcuate flanged runway the center of which is coincident with the axis of rotation of said member, said runway being provided with an opening its periphery, a tension member secured to the other of said elements, said tension member having a part embraced by said cradle and released through said opening when said cradle is rotated, means for releasably holding said cradle against rotation, and means for imparting a rotating impulse to said cradle upon release of said holding means.

ROBERT E. BAKER.
GEORGE H. KENDALL.